(12) United States Patent
Hyun

(10) Patent No.: US 9,602,300 B2
(45) Date of Patent: Mar. 21, 2017

(54) SMART DEVICE-BASED HOME NETWORK SYSTEM AND CONTROL METHOD THEREFOR

(71) Applicant: KOCOM CO., LTD., Gyeonggi-do (KR)

(72) Inventor: Jae-ho Hyun, Seoul (KR)

(73) Assignee: KOCOM CO., LTD., Bucheon-si, Gyeonggi-Do (KR)

( * ) Notice: Subject to any disclaimer, the term of this patent is extended or adjusted under 35 U.S.C. 154(b) by 0 days.

(21) Appl. No.: 14/907,806

(22) PCT Filed: Oct. 11, 2013

(86) PCT No.: PCT/KR2013/009108
§ 371 (c)(1),
(2) Date: Jan. 26, 2016

(87) PCT Pub. No.: WO2015/012434
PCT Pub. Date: Jan. 29, 2015

(65) Prior Publication Data
US 2016/0164694 A1    Jun. 9, 2016

(30) Foreign Application Priority Data

Jul. 26, 2013 (KR) .................. 10-2013-0088380

(51) Int. Cl.
*H04N 7/14* (2006.01)
*H04L 12/28* (2006.01)
(Continued)

(52) U.S. Cl.
CPC .......... *H04L 12/2803* (2013.01); *H04L 12/12* (2013.01); *H04L 12/2838* (2013.01);
(Continued)

(58) Field of Classification Search
USPC ...... 348/14.08, 14.02, E7.081, E7.089, 14.1, 348/211.12, E7.083, E7.083, 14.01, 14.04, 69,
(Continued)

(56) References Cited

U.S. PATENT DOCUMENTS

| 2002/0046299 A1* | 4/2002 | Lefeber | .................. H04L 29/06 719/318 |
| 2006/0063517 A1* | 3/2006 | Oh | .................... H04M 3/42348 455/415 |

FOREIGN PATENT DOCUMENTS

KR   10-0561633 B1   3/2006
KR   10-2006-0097844 A   9/2006
(Continued)

OTHER PUBLICATIONS

International Search Report for PCT/KR2013/009108 mailed Apr. 29, 2014 from Korean Intellectual Property Office.

*Primary Examiner* — Yosef K Laekemariam
(74) *Attorney, Agent, or Firm* — Revolution IP, PLLC

(57) ABSTRACT

A smart device-based home network system including: a plurality of peripheral devices; a smart device in which a home network application is installed; a video phone for receiving and processing information on a peripheral device, transmitted from the corresponding peripheral device, and then transmitting the information to a push server in a push manner; and the push server for transmitting, to all smart devices included in the information, a wake-up signal together with the information on the peripheral device on the basis of the processed information on the peripheral device, transmitted from the video phone.

6 Claims, 4 Drawing Sheets

(51) Int. Cl.
*H04L 12/12* (2006.01)
*H04L 29/06* (2006.01)
*H04L 12/24* (2006.01)
*H04W 52/02* (2009.01)
*H04L 29/08* (2006.01)

(52) U.S. Cl.
CPC .......... *H04L 41/00* (2013.01); *H04L 65/1006* (2013.01); *H04L 65/403* (2013.01); *H04N 7/147* (2013.01); *H04W 52/0216* (2013.01); *H04W 52/0229* (2013.01); *H04L 67/26* (2013.01); *H04L 2012/2841* (2013.01); *Y02B 60/34* (2013.01)

(58) Field of Classification Search
USPC ...................................................... 348/211.3
See application file for complete search history.

(56) References Cited

FOREIGN PATENT DOCUMENTS

| KR | 10-2006-0125237 A |   | 12/2006 |
|----|-------------------|---|---------|
| KR | 1020060125237     | * | 12/2006 |
| KR | 10-0984111 B1     |   | 9/2010  |
| KR | 10-1215025 B1     |   | 12/2012 |

\* cited by examiner

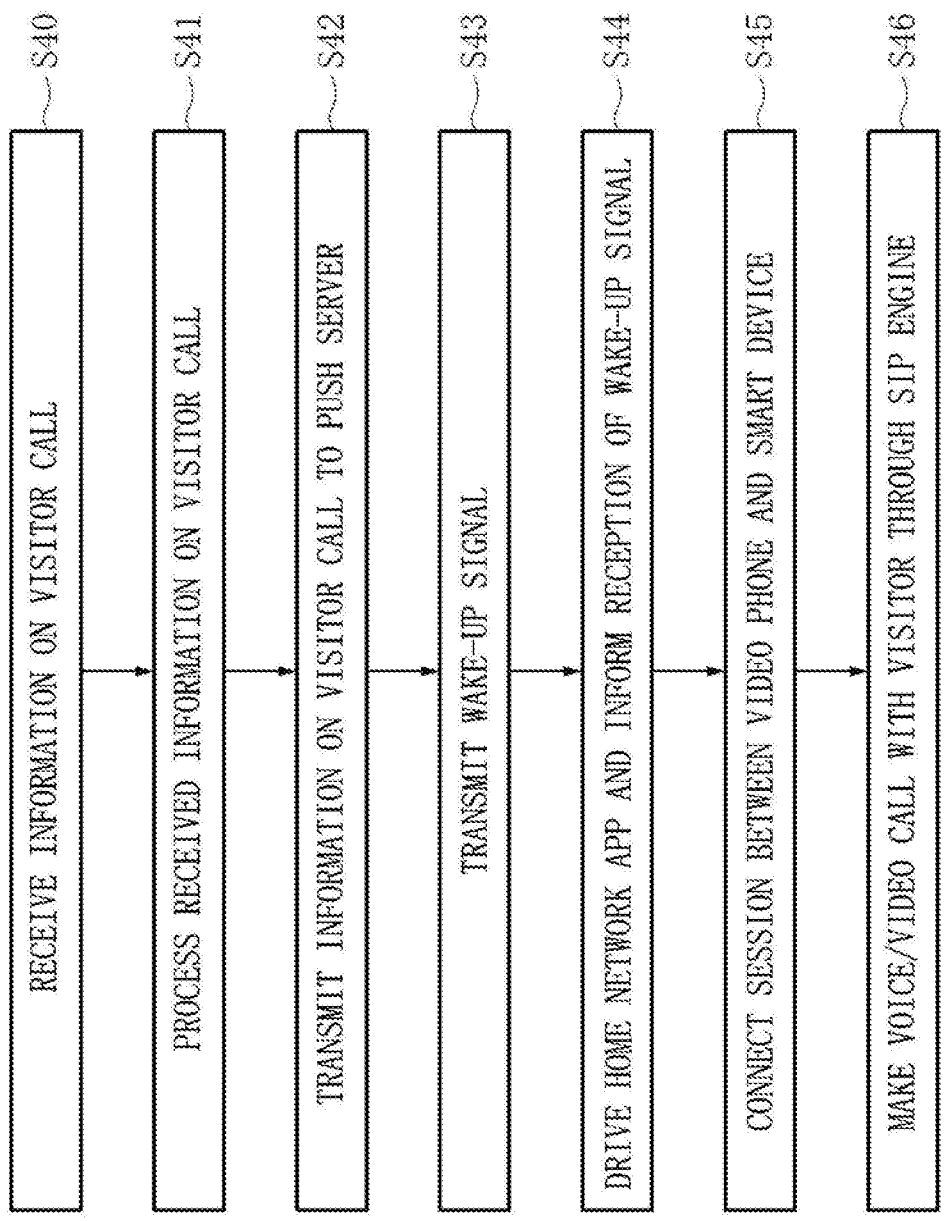

SMART DEVICE-BASED HOME NETWORK SYSTEM AND CONTROL METHOD THEREFOR

CROSS REFERENCE TO PRIOR APPLICATIONS

This application is a National Stage Application of PCT International Patent Application No. PCT/KR2013/008745 filed on Sep. 30, 2013, under 35 U.S.C. §371, which claims priority to Korean Patent Application No. 10-2013-0085458 filed on Jul. 19, 2013, which are all hereby incorporated by reference in their entirety.

TECHNICAL FIELD

The present invention relates to a smart device-based home network system and a control method therefor, and more specifically, to a smart device-based home network system which controls various in-house devices through a screen of a smart device inside or outside of the house and enables a user to make video calls with visitors, and a control method for the smart device-based home network system.

BACKGROUND ART

A home network system is a technology for controlling various devices (hereinafter, referred to as 'peripheral devices') such as a TV, an audio player, a video player, a computer, a refrigerator, and a washing machine, which are installed in a house, through wired/wireless communication and allowing the peripheral device to sharing contents with each other.

If a home network system is provided, Internet connection, connection to Internet, transmission of moving images, and transmission/reception of emails are possible through peripheral devices inside or outside of a house, thereby building a cyber home. In addition, a user can control various in-house devices by being connected to the home network system through a communication network even at a remote distance.

For example, Patent Document 1 (Korean Patent Publication No. 10-2006-0125237) discloses a home network system for providing a communication function between a portable phone of a resident of a remote place and a video phone installed at a common entrance of an apartment house such as an apartment or villa through the video phone and a communication method thereof. The home network system includes: a common entrance video phone installed at a common entrance of an apartment house such as an apartment or villa, the common entrance video phone being connected to a home network server to perform a function of allowing a visitor to make a voice call with a resident and a function of allowing the visitor to make a phone call with the resident of a remote place; the home network server for performing overall functions of the video phone according to a predetermined control program, performing a phone call by controlling connection with a specific receiving party's video phone, a regular phone, or a portable phone through a virtual office supporting an Internet phone service according to a resident's manipulation of a key input unit, performing remote control through power lines of various peripheral devices according to a request of the resident of the remote place, and providing an additional agent function of enabling the resident to perform an update, management, maintenance and repair, and desired selection of a control program for the peripheral devices; the virtual office connected to the home network server, the virtual office controlling connection with PSTN, the virtual office providing each of the peripheral devices and the video phone with an Internet phone number for an Internet phone, the virtual office providing the Internet phone service and a function of connection with the specific receiving party's video phone, the regular phone, or the portable phone; and the portable phone for performing a phone call with the visitor through the video phone and allowing the resident of the remote place to control the peripheral devices.

In addition, Patent Document 2 (Korean Patent No. 10-0561633) discloses an intelligent system for identifying and communicating to a visitor using a wireless communication terminal and a method thereof. The intelligent system includes: a doorphone interface and application processor connected to a video doorphone device, to process a bell signal event and setting/releasing of a session connection, and process voice/video data; a terminal recognizer for identifying whether a resident is absent (or present) by detecting a location of a resident's wireless communication terminal when a bell is activated by a visitor; a location information manager for identifying visitors and storing and managing contact addresses of communication terminals; and a visitor identifying and communicating proxy for requesting a session connection to a contact address of a communication terminal through which the identification and communication of a visitor are possible when the bell is activated by the visitor, providing visitor's voices (and images) and resident's voices between the video doorphone device and the communication terminal through a session channel set and connected when it is identified that the resident is present, and releasing the session according to a request of the communication terminal.

However, Patent Document 1 that attempts to communicate with a portable phone based on the virtual office is different from the present invention that directly connects a video phone and a smart device to each other without any virtual office. Also, Patent Document 2 that performs communication through a home gateway and performs communication through a streaming relay of an SIP server existing in an integrated network within an apartment complex and a common network (terminal IPS) is different from the present invention that requires no home gateway and SIP server.

Meanwhile, in a recent home network system, all functions are performed based on a wall-pad mounted on a wall of a living room, so that all peripheral devices communicate with the wall-pad in a wired/wireless manner.

Accordingly, there is a limitation in that the above-described video call with visitors through a smart device is made in only large-scale apartments, etc., in which high-performance wall pads, SIP servers, and the like are implemented.

DISCLOSURE OF THE INVENTION

Technical Problem

The purpose of the present invention is to provide a smart device-based home network system and a control method therefor, in which a software engine programmed by rearranging functions of a push server and a session initiation protocol (SIP) server is installed in a video phone, and the video phone is connected by wireless to peripheral devices through an access point (AP), so that it is possible to implement an in-house network of a simple structure, and control peripheral devices of a small-scale apartment house or personal house and make a video call with visitors through a smart device without building any wall-pad or SIP server.

Technical Solution

A smart device-based home network system includes: a plurality of peripheral devices to which a home network is connected by wireless; a smart device equipped with an operating system (OS), the smart device in which a home network application is installed to control the peripheral devices; a video phone connected to the plurality of peripheral devices through the wireless home network to receive and process information on a peripheral device, transmitted from the corresponding peripheral device and then transmit the information to a push server; and a push server for transmitting, to all smart devices included in the information, a wake-up signal together with the information on the peripheral device on the basis of the processed information on the peripheral device, transmitted from the video phone, wherein the smart device is awakened from a sleep state by receiving the wake-up signal to execute the home network application, and informs an IP address of the video phone, which is included in the received information on the peripheral device, of the reception of the wake-up signal such that a session is connected between the video phone and the smart device.

The video phone may include: an information receiving unit for receiving information on a peripheral device, transmitted from the corresponding peripheral device and transmitting the information on the peripheral device to a signal processing unit; the signal processing unit for processing the information on the peripheral device, transmitted from the information receiving unit, to allow information on a list of smart devices and addresses of the smart devices registered in the video phone and the IP address information of the video phone to be included in the information on the peripheral device, and then transmitting the processed information on the peripheral device to a push engine; and the push engine for transmitting, to the push server, the processed information on the peripheral device, transmitted from the information receiving unit.

The video phone may further include a session initiation protocol (SIP) engine for allowing streaming data to be continuously transmitted/received between the smart device and a transceiver and a camera of the video phone in a state in which a session is connected between the video phone and the smart device, thereby making a video/voice call with visitors.

When a visitor call is made through the video phone, the signal processing unit may receive and process information on the visitor call to allow the information on the list of smart devices and the addresses of the smart devices registered in the video phone and the IP address information of the video phone to be included in the information on the visitor call, and then transmit the information on the visitor call to the push server through the push engine.

When a plurality of lists of smart devices are registered in the video phone, the video phone may connect sessions to all of the smart devices registered in the video phone and transmit information to the smart devices. When any one smart device among the smart devices attempts to make a call corresponding to a visitor call, the video phone may disconnect the sessions to the other smart devices.

A method for controlling a smart device-based home network system including a peripheral device, a video phone, a push server, and a smart device includes: when information on the peripheral device is changed, transmitting, by the peripheral device, the information on the peripheral device, and receiving, by an information receiving unit of the video phone, the information on the peripheral device and then transmitting the information on the peripheral device to a signal processing unit; receiving and processing, by the signal processing unit, the information on the peripheral device and transmitting the processed information on the peripheral device to a push engine; transmitting, by the push engine, the processed information on the peripheral device to the push server; transmitting, by the push server, a wake-up signal together with the processed information on the peripheral device to the smart device included in the processed information on the peripheral device; executing, by the smart device receiving the wake-up signal, a home network application by being awakened from a sleep state, and informing an IP address of the video phone of the reception of the wake-up signal on the basis of the processed information on the peripheral device; and controlling, by the smart device, the peripheral device through the video phone or outputting the information on the peripheral device on a screen of the smart phone as a session is directly connected between the video phone and the smart device.

A method for controlling a smart device-based home network system including a peripheral device, a video phone, a push server, and a smart device includes: when a visitor call is made through the video phone, receiving and processing, by a signal processing unit of the video phone, information on the visitor call and transmitting the processed information on the visitor call to a push engine; transmitting, by the push engine, the processed information on the visitor call to the push server; transmitting, by the push server, a wake-up signal together with the processed information on the visitor call to the smart device included in the processed information on the visitor call; executing, by the smart device receiving the wake-up signal, a home network application by being awakened from a sleep state, and informing an IP address of the video phone of the reception of the wake-up signal on the basis of the processed information on the visitor call; and allowing, by an SIP engine of the video phone, streaming data to be continuously transmitted/received between the smart device and a transceiver and a camera of the video phone as a session is connected between the video phone and the smart device, thereby making a video/voice call with visitors.

In the processing, by the signal processing unit, of the information on the peripheral device or the information on the visitor call, information on a list of smart devices and addresses of the smart devices registered in the video phone and an IP address information of the video phone may be included in the information on the peripheral device or the information on the visitor call.

Advantageous Effects

According to the present invention, a software engine programmed by rearranging functions of a push server and a session initiation protocol (SIP) server is installed in a video phone, and the video phone is connected by wireless to peripheral devices through an access point (AP), so that it is possible to implement an in-house network of a simple structure, and control peripheral devices of a small-scale apartment house or personal house and make a video call with visitors through a smart device without building any wall-pad or SIP server.

BRIEF DESCRIPTION OF THE DRAWINGS

FIG. 4 is a flowchart illustrating a method for making a video/voice call with a visitor according to another embodiment of the present invention.

MODE FOR CARRYING OUT THE INVENTION

Figure 1:
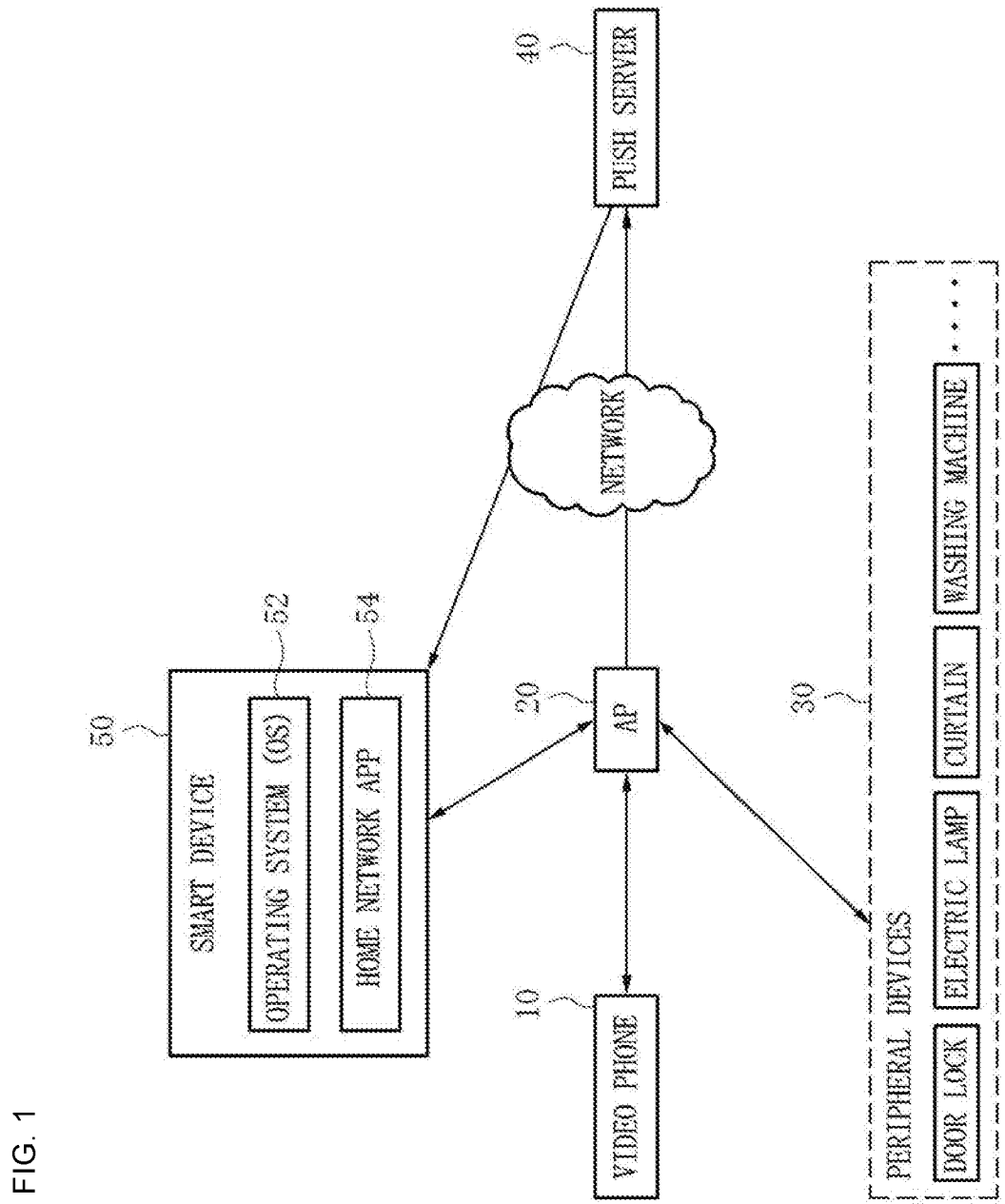
FIG. 1 is a diagram illustrating a configuration of a home network system according to an embodiment of the present invention.

Hereinafter, embodiments of the present invention will be described in detail with reference to the accompanying drawings.

In the drawings, it should be noted that the same or similar elements are denoted by the same reference numerals and symbols even though they are depicted in different drawings.

In the following description, detailed explanation of known related functions and constitutions may be omitted to avoid unnecessarily obscuring the subject manner of the present invention.

In this invention, the terms "comprising" and "including" should not be construed to necessarily include all of the elements or steps disclosed herein, and should be construed not to include some of the elements or steps thereof, or should be construed to further include additional elements or steps.

FIG. 1 is a diagram illustrating a configuration of a home network system according to an embodiment of the present invention.

As shown in FIG. 1, the home network system according to the embodiment of the present invention includes a video phone 10, an access point (AP) 20, peripheral devices 30, a push server 40, and a smart device 50.

The peripheral devices 30 are various devices constituting the home network system, such as a door lock, an electric lamp, a curtain, a washing machine, and a computer, which are provided in a house. The peripheral devices 30 may be controlled on the basis of wireless communication (Bluetooth, Zigbee, Wifi, etc.). When information on a peripheral device is changed, the changed information is provided to the video phone 10 through the AP 20 on the basis of the wireless communication.

The smart device 50 is a device equipped with an operating system (OS) 52 such as Android of Google or iOS of Apple. The smart device 50 includes not only a smart phone but also an I-Pad or smart TV.

A home network application (App) 54 is installed in the smart device 10 to implement, on a screen of the smart device 50, all screen information implemented on a screen of the existing wall-pad, and control the peripheral devices 30. A screen for setting an address (related to a network identification number) of each of the peripheral devices 30 is added to the screen of the smart device 50.

When the home network App 54 of the smart device 50 is continuously in a execute or wait state to perform communication, overall functions of the smart device 50 may be deteriorated, including battery consumption of the smart device 50. Thus, the home network App 54 is in a sleep state without being executed at normal times. If a wake-up signal is received from the push server 40 which will be described later, the home network App 54 is awakened and executed.

That is, the push server 40 awakens the smart device 50 to perform communication between the video phone 10 and the smart device 50.

It will be apparent that a user may execute the home network App 54 installed in the smart device 50 to control the peripheral devices 30, thereby performing communication between the smart device 50 and the video phone 10.

When the smart device 50 is a smart TV, the home network App may be executed in the smart TV, to control all in-house peripheral devices connected to a home network and identify their current states through the smart TV, and identify an image of a visitor as a moving image.

The video phone 10 performs an ordinary video phone function of allowing the user to identify an external visitor and make a video call with the visitor inside of the house.

That is, the video phone 10 includes a camera, a transceiver and a door-bell switch, which are provided outside of the house, and a transceiver, a display, a door lock/unlock switch, and various switches for setting security functions, which are provided inside of the house. Thus, when a visitor's call is received, a resident can identify the visitor through a displayed visitor's image and communication through the transceivers.

In addition to the ordinary function, the video phone 10 constitutes, together with the peripheral devices 30, a home network by wireless through the AP 20. Thus, the video phone 10 receives and processes a series of information transmitted from the peripheral devices 30 or information in a visitor call, and transmits the processed information to the push server 40 such that the processed information is finally transmitted to the smart device 50 of which list is stored in the video phone 10.

To this end, the video phone 10 registers an IP address assigned thereto and information on a list of smart devices (e.g., four smart phones, a smart TV, two I-Pads, etc.) and addresses of the corresponding smart devices, such as Mac addresses or SIM card numbers.

When communication is started as a session is connected between the video phone 10 and the smart device 50 through a process of FIG. 4, which will be described later, the video phone 10 relays and transmits images and voices digital-converted between the smart device 50 and the camera and transceiver provided in the video phone 10.

If a plurality of smart devices are registered in the video phone 50 when information on a visitor call is transmitted to the push server 40, the video phone 10 may transmit the information on the visitor call to all of the registered smart devices.

The push server 40 is a server that supports the OS 52 equipped in the smart device 50. For example, when the OS 52 is Android, the push server 40 may be a Google server or a self-developed independent server.

It will be apparent that when the push server 40 is a self-developed independent server, the push server 40 may be developed to support both Android and iOS.

When processed information on a visitor call or processed information on a peripheral device is received from the video phone 10, the push server 40 transmits, to all smart devices, a wake-up signal together with the processed information on the visitor call or the processed information on the peripheral device, on the basis of information on an address of the smart device 50 included in the processed information on the visitor call or the processed information on the peripheral device.

If the smart device 50 receives the wake-up signal as described above, the smart device 50 is awakened from the sleep state to execute the home network App 54 and inform an IP address of the video phone 10, which is included in the information on the visitor call or the information on the peripheral device, of data, i.e., the reception of the wake-up signal.

At the same time when the video phone 10 receives the reception of the wake-up signal from the smart device 50, direct communication is started, and since then, the role of the push sever 40 is disappeared.

When the information on the visitor call is received, the video phone 10 allows video/voice streaming data to be transmitted/received between the smart device 50 and the transceiver and camera of the video phone 10, thereby making a video/voice call.

When a plurality of lists of smart devices are registered in the video phone 10, the video phone 10 connects sessions to all of the plurality of smart devices registered in the video phone 10. In this state, when any one of the plurality of smart devices attempts to make a call, the sessions to the other smart devices are ended.

Figure 2:
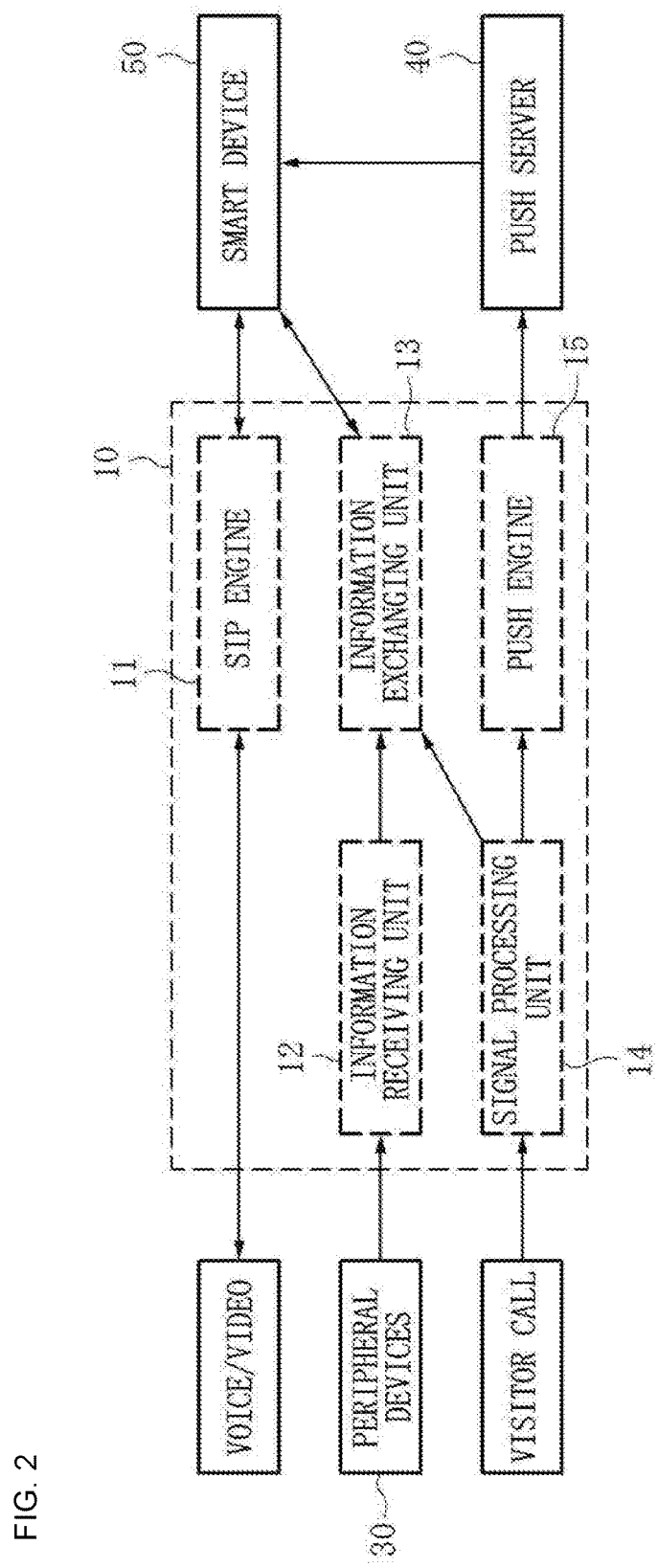
FIG. 2 is a diagram illustrating an internal configuration of a video phone shown in FIG. 1.

FIG. 2 is a diagram illustrating an internal configuration of the video phone shown in FIG. 1.

As shown in FIG. 2, the video phone 10 according to the present invention includes components of a general video phone, i.e., a camera, a transceiver and a door-bell switch, which are provided outside of a house, and a transceiver, a display, a door lock/unlock switch, and various switches for setting security functions, which are provided inside of the house. In addition, the video phone 10 further includes a session initiation protocol (SIP) engine 11, an information receiving unit 12, an information exchanging unit 13, a signal processing unit 14, and a push engine 15.

The SIP engine 11 is a software engine programmed by rearranging necessary functions of an SIP server. The SIP engine 11 allows streaming data to be continuously transmitted/received such that a video/voice call can be made between the smart device 50 and the transceiver and camera of the video phone 10 in a state in which a session is connected between the smart device 50 and the video phone 10.

The SIP engine 11 is a program that performs a core and essential function for the purpose of one object, i.e., an SIP function of transmitting and relaying digitized videos/voices.

When the information on a peripheral device 30 is changed (when a peripheral device is replaced or newly registered), if the corresponding peripheral device 30 transmits the changed information on the peripheral device 30 through the wireless home network, the information receiving unit 12 receives the information on the peripheral device 30 and transmits the information on the peripheral device 30 to the signal processing unit 14 or the information exchanging unit 13.

When a visitor makes a call by pressing the door-bell switch, the signal processing unit 14 receives information on the visitor call or receives the information on the peripheral device, transmitted from the information receiving unit 12, to process the information on the visitor call or the information on the peripheral device to allow information on a list of smart devices and addresses of the smart devices, and an IP address of its own (the video phone 10) to be included in the information on the visitor call or the information on the peripheral device, and then transmit the processed information on the visitor call or the processed information on the peripheral device to the push engine 15 or the information exchanging unit 13.

The push engine 15 is a software engine programmed by rearranging necessary functions of the push server 40. When the processed information on the visitor call or the processed information on the peripheral device is received from the signal processing unit 14, the push engine 15 transmits the corresponding information to the push server 40.

That is, the push engine 15 may identify the smart device 50 and transmit data (information) to the smart device 50.

The information exchanging unit 13 receives the information on the visitor call or the information on the peripheral device from the information receiving unit 12 or the signal processing unit 14. When a session is connected between the smart device 50 and the video phone 10, the information exchanging unit 13 enables information to be exchanged between the smart device 50 and the video phone 10.

If direct communication is made as the session is connected between the smart device 50 and the video phone 10, the roles of the push engine 15 and the push server 14 are disappeared since then.

Figure 3:
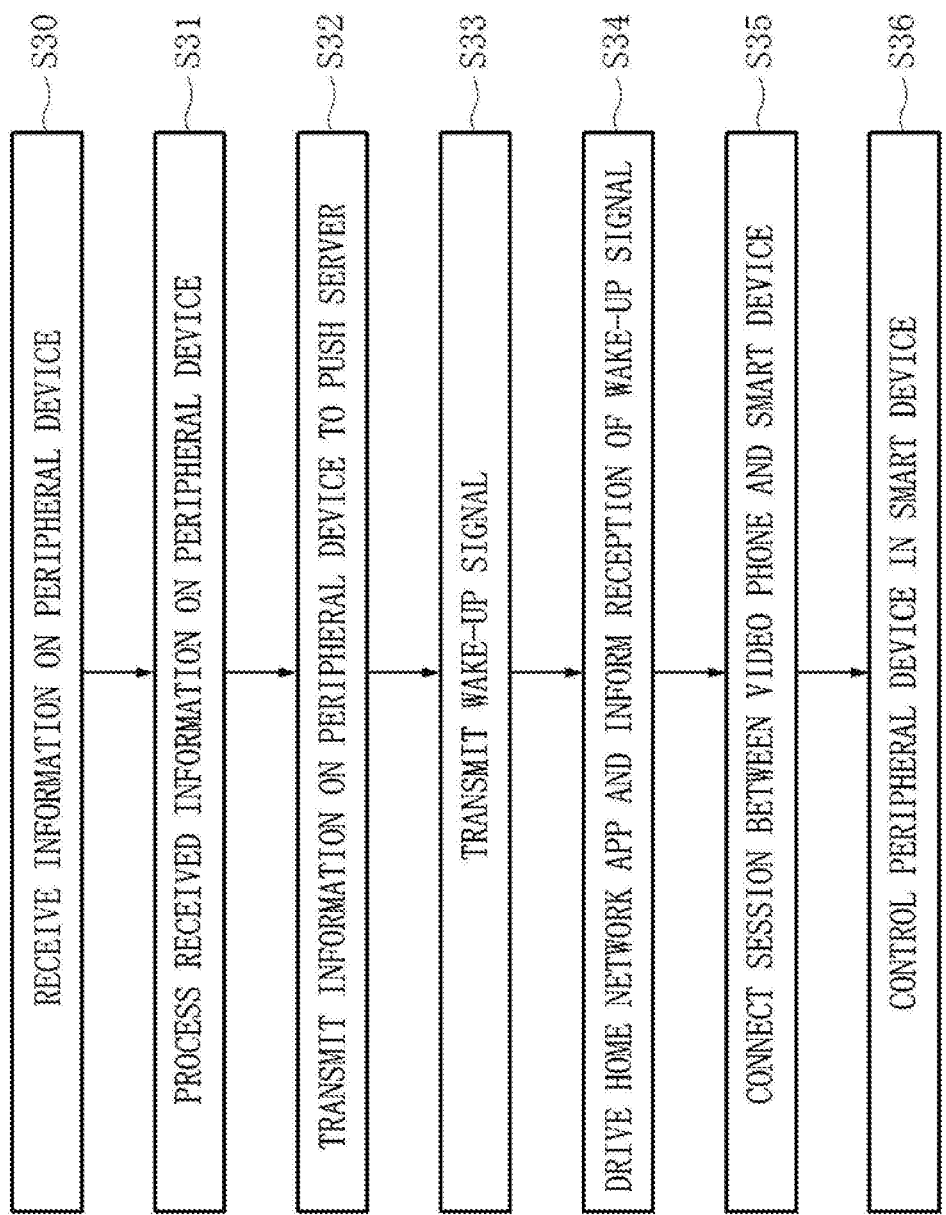
FIG. 3 is a flowchart illustrating a method for controlling peripheral devices according to an embodiment of the present invention.

FIG. 3 is a flowchart illustrating a method for controlling peripheral devices according to an embodiment of the present invention.

When information on a peripheral device 30 such as a door lock, an electric lamp, and a washing machine is changed, corresponding peripheral devices 30 transmit the information on the peripheral device 30 to the information receiving unit 12 of the video phone 10 through the AP 20 connected to the wireless home network. The information receiving unit 12 receives the information on the peripheral device 30 and transmits the information on the peripheral device 30 to the signal processing unit 14 (S30).

The signal processing unit 14 receives the information on the peripheral device 30, transmitted from the information receiving unit 12, and processes the information on the peripheral device 30 to allow information registered in the video phone 10, i.e., information on a list of smart devices and addresses of the smart devices, and an IP address of its own (the video phone 10) to be included in the information on the peripheral device 30. Then, the signal processing unit 14 transmits the processed information on the peripheral device 30 to the push engine 15 (S31).

The push engine 15 transmits the processed information on the peripheral device 30 to the push server 40, the Google server when the OS 52 of the smart device 50 is Android (S32).

The push server 40 transmits, to the address of the smart device 50 included in the list, the information on the peripheral device 30 (including the information on the IP address of the video phone 10) together with a wake-up signal so as to awaken the smart device 50 in the sleep state, on the basis of the information on the list of smart devices and the addresses of the smart devices, included in the processed information of the peripheral device 30 (S33).

When a plurality of lists of smart devices are registered in the video phone 10, the push server 40 does not determine the priority order of the smart devices, and transmits the information on the peripheral device 30 and the wake-up signal in a broadcast manner.

The smart device 50 receiving the wake-up signal is awakened from the sleep state to register the received information on the peripheral device 30 by executing the home network App 54, and informs the IP address of the video phone 10 of the reception of the wake-up signal (S34).

Accordingly, a session is connected between the video phone 10 and the smart device 50, so that direct communication is started (S35).

Since then, the roles of the push engine 15 of the video phone 10 and the push server 40 are disappeared, and the smart device 50 and the video phone 10 are directly connected to each other. Thus, the smart device 50 controls the peripheral device 30 through the video phone 10 or outputs the information on the peripheral device 30 on a screen thereof (S36).

FIG. 4 is a flowchart illustrating a method for making a video/voice call with a visitor according to another embodiment of the present invention.

When a visitor makes a call by pressing the door-bell switch outside the house, the signal processing unit 14 receives information on the visitor call (S40), and processes the information on the visitor call to allow information registered in the video phone 10, i.e., information on a list of smart devices and addresses of the smart devices, and an IP address of its own (the video phone 10) to be included in the information on the visitor call, and then transmits the processed information on the visitor call to the push engine 15 (S41).

The push engine 15 transmits, in push manner, the processed information on visitor call to the push server 40, i.e., the Google server when the OS 52 of the smart device 50 is Android (S42).

The push server 40 transmits, to the address of the smart device 50 included in the list, the information on the visitor call (including the information on the IP address of the video phone 10) together with a wake-up signal so as to awaken the smart device 50 in the sleep state, on the basis of the information on the list of smart devices and the addresses of the smart devices, included in the processed information on the visitor call (S43).

When a plurality of lists of smart devices are registered in the video phone 10, the push server 40 does not determine the priority order of the smart devices, and transmits the information on the visitor call and the wake-up signal in the broadcast manner.

The smart device 50 receiving the wake-up signal is awakened from the sleep state to identify the received information on the visitor call by executing the home network App 54, and informs the IP address of the video phone 10 of the reception of the wake-up signal (S44).

Accordingly, a session is connected between the video phone 10 and the smart device 50, so that direct communication is started (S45).

Since then, the roles of the push engine 15 of the video phone 10 and the push server 40 are disappeared, and the smart device 50 and the video phone 10 are directly connected to each other. Thus, the SIP engine allows streaming data to be continuously transmitted/received between the smart device 50 and the transceiver and camera of the video phone 10 in the SIP engine 11, thereby making a video/voice call with the visitor (S46).

When a plurality of smart devices inform the reception of the wake-up signal in step S44, the video phone connects sessions to the plurality of smart devices to transmit an image of the visitor to the plurality of smart devices.

When a specific smart device among the plurality of smart devices attempts to make a call, the sessions between the video phone 10 and the other smart devices are disconnected.

Although the present invention has been described in connection with the preferred embodiments, the present invention is not limited thereto but defined by the appended claims. Accordingly, it will be understood that various modifications and changes can be made thereto without departing from the spirit and scope of the invention defined by the appended claims.

The invention claimed is:

1. A smart device-based home network system, comprising:
   a plurality of peripheral devices being connected by wireless network communication;
   a smart device equipped with an operating system (OS), the smart device in which a home network application is installed to control the peripheral devices;
   a video phone connected to the plurality of peripheral devices through the wireless network communication to receive and information corresponding to each of the peripheral devices, the information being transmitted from each of the peripheral devices and transmit the information to a push server; and
   a push server to transmit the information corresponding to each of the peripheral devices and a wake-up signal together with the information to all of the peripheral devices based on a broadcasting manner without determination of priority order for wakening up the peripheral devices,
   upon receipt of the wake-up signal transmitted in the broadcasting manner from the push server, the smart device is awakened from a sleep state to process the received information on each of the peripheral devices by executing the home network application, to execute the home network application of the reception of the wake-up signal, and to inform an IP address of the video phone, which is included in the received information on each of the peripheral devices, such that a session is connected between the video phone and the smart device, wherein
   the video phone includes a session initiation protocol (SIP) engine to allow streaming data to be continuously communicated between the smart device and the video phone, and wherein
   the communication between the push server and the video phone is disconnected.

2. The smart device-based home network system of claim 1, wherein the video phone further includes:
   an information receiving unit to receive information on the peripheral devices transmitted from the corresponding one of the peripheral devices and transmitting the information on the peripheral devices to a signal processing unit;
   the signal processing unit to process the information on the peripheral device, transmitted from the information receiving unit, to allow information on a list of smart devices and addresses of the smart devices registered in the video phone and the IP address information of the video phone to be included in the information on the peripheral device, and then transmitting the processed information on the peripheral device to a push engine; and
   the push engine to transmit, to the push server, the processed information on the peripheral devices, transmitted from the information receiving unit.

3. The smart device-based home network system of claim 2, wherein
   upon receipt of call through the video phone, the signal processing unit is configured to receive and process information on the call to allow the information on the list of smart devices and the addresses of the smart devices registered in the video phone and the IP address information of the video phone to be included in the information on the call, and then to transmit the information on the call to the push server through the push engine.

4. The smart device-based home network system of claim 3, wherein when a plurality of lists of smart devices are registered in the video phone, the video phone is configured to connect sessions to all of the smart devices registered in the video phone and to transmit information to the smart devices, and wherein when any one of the smart devices among the smart devices attempts to make a call corresponding to the call, the video phone is configured to disconnect the sessions to the other smart devices.

5. A method for controlling a smart device-based home network system including peripheral devices, a video phone, a push server, and a smart device, the method comprising:

upon receiving a call through the video phone, processing, by a signal processing unit of the video phone, information on the visitor call and transmitting the processed information on the call to a push engine;

transmitting, by the push engine, the processed information on the call to the push server, the information being transmitted from each of the peripheral devices;

transmitting, by the push server, the information corresponding to each of the peripheral devices and a wake-up signal together with the information to all of the peripheral devices based on broadcasting manner without determination of priority order for wakening up the peripheral devices;

upon receipt of the wake-up signal transmitted in the broadcasting manner from the push server, executing, by the smart device receiving the wake-up signal, a home network application by being awakened from a sleep state to register the received information on each of the peripheral devices by executing the home network application, and informing an IP address of the video phone which is included in the received information on each of the peripheral devices; and allowing, by a session initiation protocol (SIP) engine of the video phone, streaming data to be continuously communicated between the smart device and the video phone, wherein the communication between the push server and the video phone is disconnected.

6. The method of claim 5, wherein the information on the call, information on a list of smart devices and addresses of the smart devices registered in the video phone and an IP address information of the video phone are included in the information on the call.

* * * * *